Aug. 2, 1955 F. J. WALDSCHUTZ 2,714,339
SYSTEM FOR TRIMMING WELDED JOINTS
Filed June 21, 1949 2 Sheets-Sheet 1
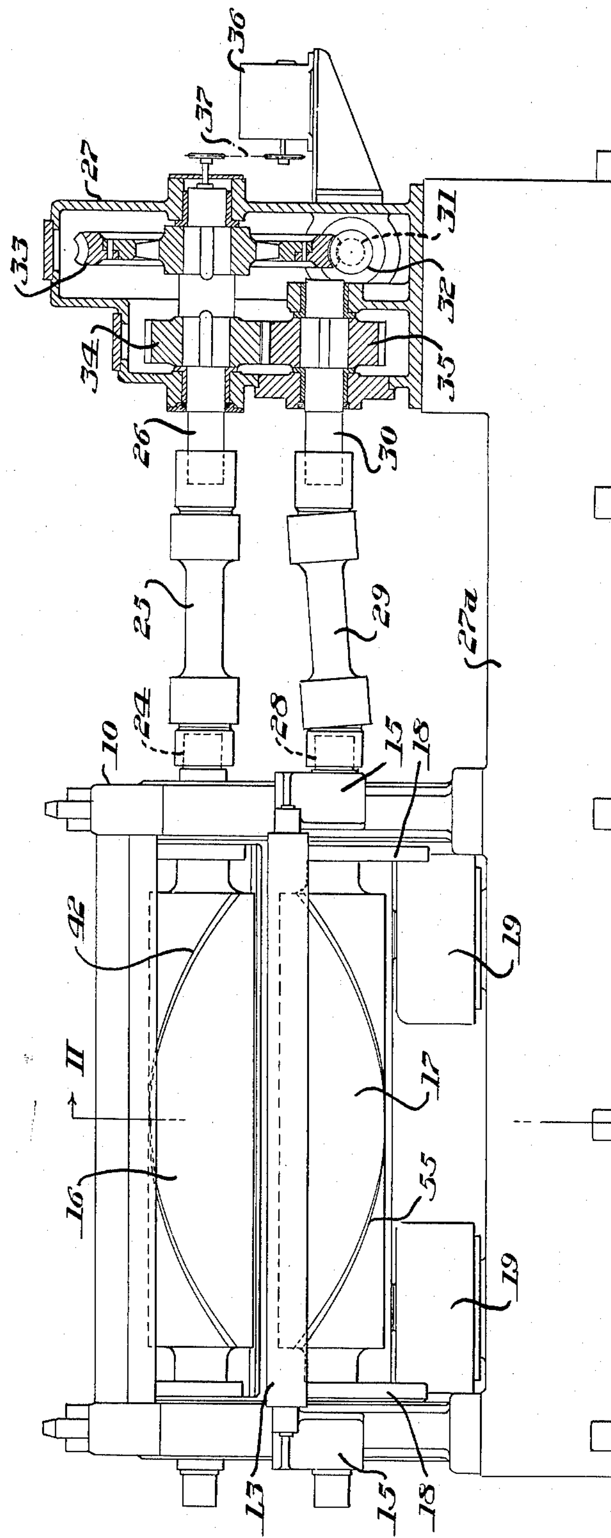
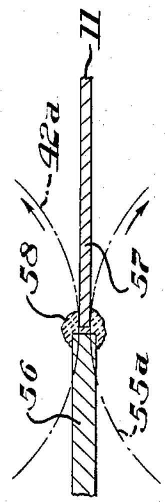
INVENTOR
FRANZ J. WALDSCHUTZ
By his attorneys
Hoopes, Leonard & Glenn 39
40
41
42

16
47
48
45
46
39
49
40
50
51
43
44
41
24'
38a
38
42
49
50
51

10
11
13
15
18
16
17
55
52
21
53
54
23
18
11a
22
20
19
14
12
27a
INVENTOR
FRANZ J. WALDSCHUTZ
By his attorneys
Hoopes, Leonard & Glenn United States Patent Office 2,714,339
Patented Aug. 2, 1955

2,714,339

SYSTEM FOR TRIMMING WELDED JOINTS

Franz J. Waldschutz, Pittsburgh, Pa., assignor to Mesta Machine Company, Pittsburgh, Pa., a corporation of Pennsylvania Application June 21, 1949, Serial No. 100,381

10 Claims. (Cl. 90—33)

This invention relates to a system for trimming welded joints, and more particularly to apparatus for and a method of trimming welded joints in strip metal in preparation for subsequent processing of the strip metal.

In the art of rolling thin flat strip metal it is commonly the practice to weld two or more coils of metal together after they have been formed in the hot mill before subjecting them to the further steps of pickling and cold rolling. The weld is most effectively accomplished by a method of flash welding discussed in Patent No. 2,203,151 to Iversen. According to this method, the ends of the strips to be welded are brought into close proximity while an electric current is arced across the gap separating them, heating up the edges of the metal. When the welding temperature has been reached, the two strip ends are forced together resulting in a weld which is thicker than the parent metal and which projects from both surfaces of the strip. Before the strip is delivered to a cold rolling mill, the thickness of the weld should be reduced in order to prevent injury to processing equipment through which the welded strip subsequently passes. In addition, the abutting welded ends should be shaved to substantially equal thickness in order to eliminate the projecting edges of the thicker of the two ends. A difference in thickness between the two ends results from the fact that each coil of metal coming from the hot rolling mill tapers gradually in thickness from a relatively light gauge at the leading end to a relatively heavy gauge at the trailing end of the coil, the difference in thickness at the ends amounting to as much as 0.01" and rarely less than 0.005" for average coil thicknesses ranging between about 0.06 and 0.19". The leading end of such a coil as it comes from the hot rolling mill becomes the trailing end when the coil is unwound and consequently the leading end of each coil welded onto a continuous strip before further processing is appreciably thicker than the adjacent trailing end of the preceding coil in the strip.

Trimmers heretofore in use for removing the flash from welded joints in continuous strips of metal have removed the larger portion of the projecting flash but have not been capable of removing all of the projecting flash and also have not been capable of shaving the abutting welded ends of the strip section to substantially equal thickness. For example, Patent No. 2,202,910 to Iversen discloses a trimmer which has a set of blades mounted on opposite sides of a travelling strip for the purpose of trimming the flash from the welded joints in the strip. The blades depend upon movement of the strip for cutting action and as a result the blades cannot be brought to the level of the strip in order to eliminate all of the projecting flash because of the danger of scoring the strip adjacent the weld line. Moreover, it is not feasible to adjust stationary blades to trim the welded ends to substantially the same thickness adjacent the weld line because the thick leading end of the coil last added to the continuous strip would necessarily be reduced in thickness along a considerable length of the strip and the pull on the strip needed to make such a cut would be excessive and would probably break the strip. Even when stationary blades are adjusted merely to trim the projecting portion of the weld flash it has been found that the strain resulting from drawing the strip through the blades is likely to tear the strip, particularly in the case of tin plate gauges approximately 0.06" thick.

According to the present invention a system is provided for holding the welded joint between cutting blades and swinging the cutting blades in successive arcs having their nearest approach at the weld line until the projecting flash is entirely removed and in addition the thicker of the two welded coil ends is tapered to the thickness of the abutting thinner end. The resulting hollowed-out joint is substantially smooth and ridgeless and materially reduces the wear on the processing equipment through which the joint subsequently passes. The strip is held stationary during the cutting operation and power is appplied to the blades instead of to the strip, thereby making it possible to position the welded point in the best position relative to the paths of the blades before the cutting operation and to control the speed of the relative movement between the blades and the strip to reduce stresses in the strip during the cutting operation.

Other details, objects and advantages in the invention will become apparent from the following detailed description and in the accompanying drawings. I have shown in the drawings, for purposes of illustration only, the following preferred embodiment of the apparatus of my invention, in which:

Figure 1 is a rear view of a trimmer incorporating my invention, showing the cutting rolls and strip clamping means in separated position and showing the cutting roll driving connections partially sectioned;

Figure 5 is a diagrammatic illustration of the action of the cutting rolls on a welded joint in a continuous strip.

Figure 2:
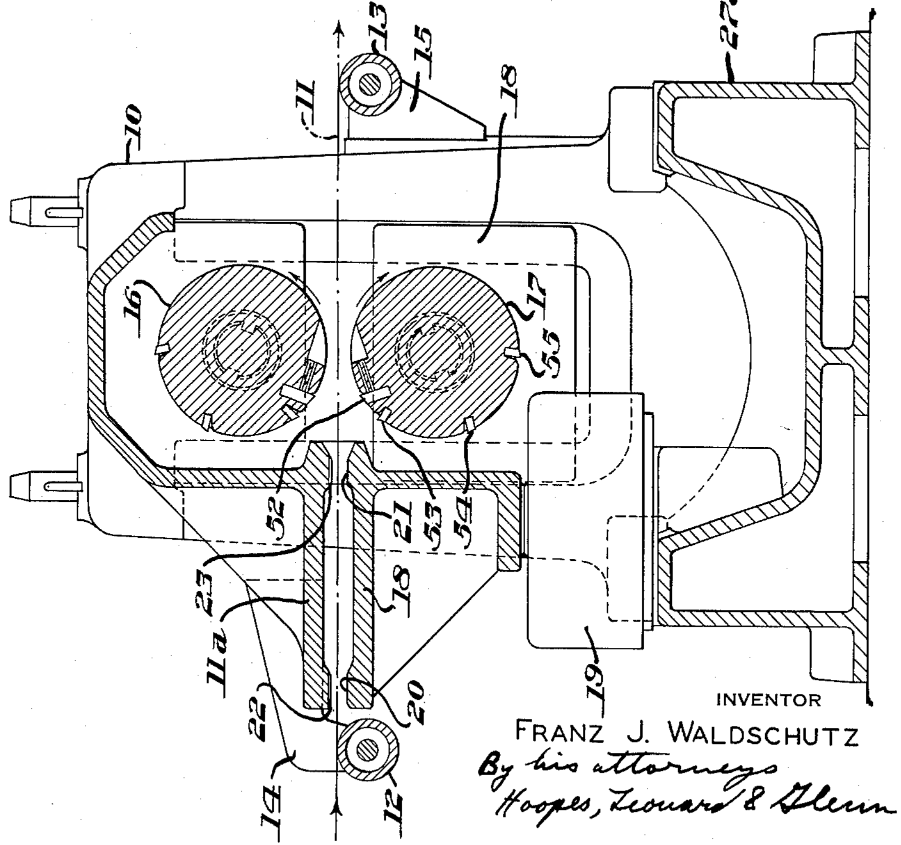
Figure 2 is a sectional view of the trimmer taken through the line II—II in Figure 1, with the driving connections generally omitted and with the rolls rotated to their normal rest position.

Referring first to Figure 2 of the drawings, 10 designates a trimmer roll stand through which a horizontal flat flexible metal strip 11 is arranged to pass from a flash welder (not shown) such as the kind described in the above-mentioned Patent No. 2,203,151. The strip 11 is drawn to the right as shown in Figure 2 by driven pinch rolls (not shown) toward a pit (not shown) in which the strip accumulates as it is drawn intermittently through the flash welder and trimmer and from which the strip is withdrawn continuously for subsequent processing in a pickler line or the like. While the strip 11 is being drawn through the stand 10 it is supported by an idler roller 12 extending across the front of the stand and by an idler roller 13 extending across the rear of the stand. The rollers 12 and 13 are journaled in pairs of spaced brackets 14 and 15, mounted in fixed positions on the stand 10.

The strip 11 passes through the stand 10 between a pair of cylindrical cutting rolls 16 and 17. The upper cutting roll 16 is journaled in a fixed but adjustable position in the stand 10 and directly below it the lower roll 17 is journaled in a fixed but adjustable position in a frame 18 which is mounted for vertical movement in the stand 10. A pair of spaced pneumatic lifts indicated generally at 19 are connected to raise and lower the frame 18 in the stand 10. The frame 18 has a pair of upwardly facing clamping surfaces 20 and 21 which extend transversely beneath the strip 11 between the front roller 12 and the cutting rolls 16 and 17 and the stand 10 has fixed portion 11*a* with downwardly facing clamping surfaces 22 and 23 positioned above the strip 11 directly opposite to the respective clamping surfaces 20 and 21. When the frame 18 is in its lowered position the strip 11 rides over the rollers 12 and 13 about an inch below the upper clamping surfaces 22 and 23 and entirely out of contact with any of the clamping surfaces or cutting rolls. When the pneumatic lifts 19 are operated to raise the frame 18 the strip 11 is clamped and held between the surfaces 20, 21, 22 and 23 and at the same time an adjacent portion of the strip is held in trimming position between the cutting rolls 16 and 17. Changes in the strip thickness change the spacing between the clamping surfaces and thus automatically cause a compensating change of spacing between the cutting rolls.

The roll 16 has a driving neck 24 projecting laterally from the stand 10 and a universal coupling 25 connects the neck 24 with a shaft 26 extending from a gear housing 27. The gear housing 27 and the roll stand 10 are mounted on a common base 27*a*. The cutting roll 17 has a similar driving neck 28 connected by a universal coupling 29 to a shaft 30 which also extends from the gear housing 27. A motor (not shown) drives a shaft 31 journaled in the gear housing 27 and keyed to a worm 32 which is in driving engagement with a worm wheel 33 keyed to the shaft 26. Also keyed to the shaft 26 is a spur gear 34 meshing with a spur gear 35 keyed to the shaft 30. The spur gears 34 and 35 have the same number of teeth and the rolls 16 and 17 are of the same diameter so that the blades on the rolls will move at the same rate of speed and in constant relative alignment. A control mechanism shown generally at 36 is connected through a chain and sprocket drive 37 to the shaft 26 and is also connected to the driving motor for the shaft 31. When the driving motor is turned on it rotates the rolls 16 and 17 through one complete revolution and then the control mechanism 36 cuts off the motor and stops the rolls 16 and 17 at the same position after each cutting operation.

The roll 16 has a body 38 with a cylindrical central portion carrying blades arranged to cut in a direction away from the clamping surfaces 20, 21, 22 and 23. These blades consist of a leading blade 39, which is centrally located and narrow relative to the axis of the roll, and three following blades 40, 41 and 42 arranged in herringbone formation with their cutting edges lying in cylindrical planes. Each of the three following blades is formed of a pair of helical blades which come together in a wedge pointed toward the leading blade 39 and which extend helically around the cylindrical body 38 (the roll 16 is turned in Figure 1 to show the outer ends of the trailing blade 42). The leading blade 39 is inserted in an opening made in the body 38 with the head of a screw 43 in the base of the blade 39 bearing against the opposite head of a screw 44 screwed into the bottom of the opening. The radial projection of the blade 39 is adjustable by turning the screw 43 and the blade 39 is held firmly in place by a pair of rods 45 and 46 extending through openings in the body 38 to press against one side of the blade 39, the other ends of the rods 42 and 43 being locked by screws 47 and 48, respectively. The blades 40, 41 and 42 fit within helical grooves in the body 38 and are held in place by wedges 49 pressing against one side of each of these blades and by parallel serrations 50 along the opposite side of each blade interlocking with corresponding serrations 51 along the adjacent side of the corresponding groove in the body 38. The blades 40, 41 and 42 may be loosened and advanced radially to the next position in which the serrations interlock and then may be wedged in place again and reground when the edges of these blades wear down appreciably. The respective wedges 49 extend continuously along the length of each adjacent blade between the blade and one side of the surrounding groove in the body 38. In order to hold the wedges 49 and hence the adjacent blade firmly but removably in place a series of spaced screws are inserted in radially extending screw holes formed in and between the wedges 49 and the adjacent sides of the surrounding grooves in the body 38.

The cutting roll 17 has blades 52, 53, 54 and 55 corresponding to the blades 39, 40, 41 and 42 of the cutting roll 16, the roll 17 being identical in construction with the roll 16 except that its driving neck is oppositely positioned relative to the cutting direction of the blades. The rolls 16 and 17 rotate under control of the meshing spur gears 34 and 35 with the corresponding blades of the rolls aligned opposite to each other as the blades swing together at the center line between the rolls. This opposite alignment and converging movement of the blades has the effect of centering a welded joint between the cutting rolls while the joint is held against the lateral cutting action of the blades by the surfaces 20, 21, 22 and 23 clamped against an adjacent portion of the strip. The arrangement of the blades in helical and herringbone formation contributes to this centering effect.

Figure 4:
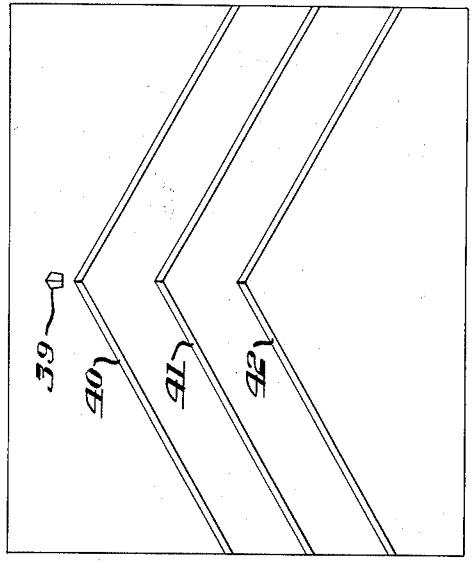
Figure 4 is a projection of the cylindrical face of the cutting roll shown in Figure 3.
Figure 3:
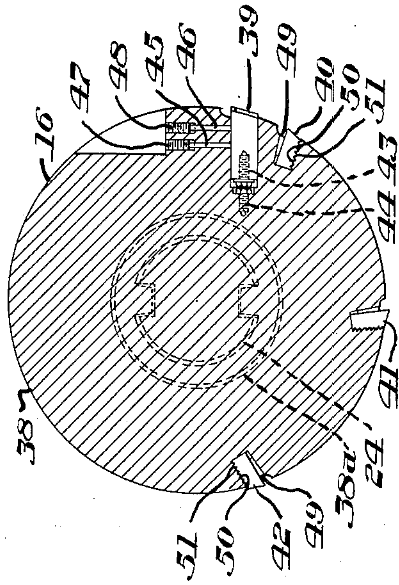
Figure 3 is an enlarged sectional view of the upper cutting roll shown in Figure 2.

A constant alignment of the blades in the cutting rolls 16 and 17 is satisfactory for trimming the usual strips ranging in average thickness between 0.06″ and 0.19″ and having a thickness differential at the welded joints ranging between 0.01″ and 0.005″. The preferred constant alignment for this purpose is as follows: The trailing blades 42 and 55 are given the greatest radial projection from the respective rolls 16 and 17, with the leading blades 39 and 52 each set 0.005″ radially inward of the respective trailing blades 42 and 55, with the following blades 40 and 53 each set 0.080″ radially inward of the respective trailing blades 42 and 55, and with the second following blades 41 and 54 each set 0.040″ radially inward of the respective trailing blades 42 and 55. In addition, the helical following blades are arranged close to each other circumferentially, as illustrated in Figure 4, so that while one of these blades is shearing away the welded joint at two spaced points the following blade is shearing more deeply at two intermediate points in the welded joint. In this way the cutting rolls cut progressively through a welded joint with a minimum of strain on the strip or the joint itself during the trimming operation.

The spacing between the rolls 16 and 17 is adjusted so that the trailing blades 42 and 55, which have the greatest radial projection, will trim a welded joint as indicated by the chain lines 42*a* and 55*a* in Figure 5. This figure shows diagrammatically and in exaggerated proportions the leading end 56 of a coil added to the continuous strip 11 and the thinner trailing end 57 of the preceding section of the strip, the two ends being butt-welded together at 58. It is an object of my invention to swing the cutting blades in arcs which are tangential to the thinner side of the strip adjacent each welded joint and in order to do this the cutting rolls 16 and 17 are adjusted until their trailing blades 42 and 55 have a nearest approach equal to the thickness of the relatively thin trailing end 57. Once the rolls have been spaced in this manner for a particular strip it is usually unnecessary to make this adjustment again for successive welded joints in the same strip or even for different strips because the spacing between the clamping surfaces 20, 21, 22 and 23 varies with the thickness of the strip adjacent each joint and ordinarily serves to vary the spacing between the cutting rolls to trim successive welded joints in the desired manner. If it is observed that the joints are not being trimmed in a satisfactory manner the spacing between the rolls 16 and 17 is readjusted accordingly.

When the trimmer is not in use the movable frame 18 is held in its lowered position and the cutting rolls 16 and 17 are positioned with their blades turned away from the strip 11 (Figure 2). After the leading end of a new coil is butt-welded to the trailing end of a coil already incorporated in the strip 11 the resulting welded joint is drawn into the trimmer over the roller 12 and inching controls on the strip moving mechanism are used to position the welded joint on the center line between the cutting rolls 16 and 17. Lateral movement of the strip 11 is then halted and the lifts 19 are operated to raise the frame 18 until the strip 11 is firmly held between the clamping surfaces 20, 21, 22 and 23. As a result of this action the cutting rolls are brought together with the welded joint positioned between them for the trimming operation. The motor driving the shaft 31 is then turned on and the rolls 16 and 17 are turned through one complete revolution and are stopped through the action of the control mechanism 36. This completes the trimming of the joint and the frame 18 is lowered to permit resumption of fast and unimpeded movement of the strip 11 through the stand 10. The whole trimming operation is completed in no more than 15 seconds and provides a hollowed-out joint which tapers in thickness and is substantially ridgeless. The trimming time is suitable for high speed continuous strip processing operations and strips having joints trimmed in accordance with my invention pass through the subsequent processing operations with a minimum of wear on the high speed rolls which draw the strip and the trimmed joints through the processing equipment.

While I have shown and described certain preferred embodiments of the invention and have illustrated certain preferred methods of practicing the same it is to be distinctly understood that the invention is not limited thereto but may be otherwise variously embodied and practiced within the scope of the following claims:

I claim:

1. A method of preparing for subsequent processing a workpiece which includes two flat-surfaced flexible metal strips welded end to end in abutting relationship, the welded ends being of unequal thickness and having an overlay of flash metal, comprising placing the welded joint between cutter blades, holding the strips while swinging the blades on each side of the joint in arcuate paths which are tangential at the weld line to the respective flat surfaces of the thinner of the two welded ends, the blades being arranged and timed to make corresponding concurrent cuts in the same direction on opposite sides of each different portion of the joint, and thus removing the projecting ridges of the thicker of the two welded ends and also the overlay of flash metal from both of the welded ends.

2. A method of preparing for subsequent processing a workpiece which includes two flat-surfaced flexible metal strips welded end to end in abutting relationship, the welded ends being of unequal thickness and having an overlay of flash metal, comprising placing the welded joint between cutter blades, holding the strips stationary adjacent the joint while swinging the blades on each side of the joint in opposite arcuate paths which have their nearest approach at the weld line, the blades being arranged and timed to make corresponding concurrent cuts in the same direction on opposite sides of each different portion of the joint, and taking successively deeper cuts until the arcuate blade paths at the weld line are tangential to the respective flat surfaces of the thinner of the two welded ends, and thus removing the projecting ridges of the thicker of the two welded ends and also the overlay of flash metal from both of the welded ends.

3. A method of preparing for subsequent processing a continuous metal strip arranged to travel through a series of processing operations and including two flat-surfaced flexible metal strip sections with the trailing end of the leading section butt welded to the leading end of the following section, the last-mentioned end being appreciably thicker than the first-mentioned end and the welded ends having an overlay of flash metal, said method comprising passing the welded joint between cutter blades, seizing a portion of the strip which trails the welded joint, and swinging the blades of each side of the joint in the direction of normal travel of the strip and in arcuate paths which are tangential at the weld line to the respective flat surfaces of the thinner of the two section ends, the blades being arranged and timed to make corresponding concurrent cuts in the same direction on opposite sides of each different portion of the joint, and the blades being directed to cut initially into the respective flat sides of the relatively thick section end where there is no overlay of flash metal, thereby tapering the thick section end to the thickness of the thin section end and removing the overlay of flash metal from both of the section ends.

4. A method of preparing for subsequent processing a continuous metal strip arranged to travel through a series of processing operations and including two flat-surfaced flexible metal strip sections with the trailing end of the leading section butt welded to the leading end of the following section so that the welded joint extends in a straight line transversely across the sections with an overlay of flash metal on both sides of the joint, the said end of the following section being appreciably thicker than the adjacent end of the leading section, said method comprising seizing the following section to hold the welded joint stationary and while the joint is so held swinging cutter blades on opposite sides of the joint in the direction of normal travel of the strip and in arcuate paths which are tangential at the weld line to the respective flat surfaces of the thinner of the two section ends, the blades being arranged and timed to make corresponding concurrent cuts in the same direction on opposite sides of each different portion of the joint, and the blades all being swung about axes lying in a plane through the weld line perpendicular to the adjacent portions of the strip, and at least one blade on each side of the welded joint being swung in a sufficiently flat arc to cut initially into the relatively thick section end where there is no overlay of flash metal, thereby tapering the thick section end to the thickness of the thin section end and entirely removing the overlay of flash metal from both of the section ends.

5. A machine for trimming a flexible metal strip made up of elongated sections butt welded end to end, comprising a pair of frames, a pair of cutting rolls journalled on the respective frames with co-planar axes, a plurality of corresponding blade portions on the respective rolls swingable into closely spaced relation for trimming a butt welded joint across the strip, each succeeding blade portion on each roll projecting radially outwardly from the axis of the roll a distance greater than the preceding blade, means to rotate the rolls simultaneously in opposite directions to swing corresponding blade portions of the respective rolls concurrently and in the same direction through the plane extending through and between the roll axes, means on the frame on opposite side of said plane for supporting the strip for endwise movement through the cutting rolls along a pass-line which is substantially normal to said plane where it intersects the plane, a pair of opposed clamping members mounted on the respective frames on opposite sides of the pass-line and both spaced from said plane on the side thereof from which the blades swing into cutting position, said clamping members being openable to allow the strip to pass therethrough when the cutting rolls are not in operation and closeable to clamp and hold the strip in tension against the force of the blades when the cutting rolls are in operation, the portion of the strip extending through said plane between the clamping members and supporting means being disposed substantially normal to said plane and in flexibly self-centering relation between the cutting rolls during the cutting operation, mounting means on each frame holding the clamping member and the axis of rotation of the roll on said frame in fixed relation to said frame, and means mounting said frames for relative movement to open and close the clamping members and at the same time to effect an equal relative movement of the cutting rolls, whereby variations of strip thickness vary the spacing between the clamping members holding the strip and thereby automatically adjust the spacing between the cutting rolls to accommodate different strip thicknesses.

6. A machine for trimming a flexible metal strip made up of elongated sections butt welded end to end, comprising frame means, a pair of cutting rolls with corresponding blades thereon, each roll having a cylindrical body and a plurality of helically extending blades mounted thereon, each succeeding blade as the roll rotates having a greater radial projection of its edge from the roll axis than the preceding blade, means journalling the cutting rolls to rotate with their axes co-planar and with their corresponding blade portions swingable into closely spaced relation for trimming a butt welded joint across the strip, means to rotate the rolls simultaneously in opposite directions to swing corresponding blade portions of the respective rolls concurrently in the same direction through the plane extending through and between the roll axes, means on the frame on opposite sides of said plane for supporting the strip for endwise movement through the cutting rolls along a pass-line which is substantially normal to said plane where it intersects the plane, and clamping means on the roll journalling means adjacent the pass-line and spaced from said plane on the side thereof from which the blades swing into cutting position, said clamping means being openable to allow the strip to pass therethrough when the cutting rolls are not in operation and closeable to clamp and hold the strip in tension against the force of the blades when the cutting rolls are in operation, and means on the frame means opening and closing the clamping means in cooperation with the opening and closing of the cutting rolls, the portion of the strip extending through said plane between the clamping and supporting means being disposed substantially normal to said plane and in flexibly self-centering relation between the cutting rolls during the cutting operation, whereby a welded joint connecting adjacent flexible strip sections is quickly and evenly trimmed between the cutting rolls.

7. A machine for trimming a flexible metal strip made up of elongated sections butt welded end to end, comprising frame means, a pair of cutting rolls with corresponding blades thereon, each of said rolls having a cylindrical body and a plurality of helically extending blades mounted thereon in herringbone formation, each succeeding blade as the roll rotates having a greater radial projection of its edge measured radially from the roll axis than the preceding blade and the blades being spaced sufficiently close together circumferentially of the roll so that while one of the blades is shearing a welded joint at two relatively widely spaced points the following blade is shearing more deeply into intermediate points in the welded joint, a narrow leading blade in advance of the plurality of blades at the apex of the herringbone formation and projecting radially a distance equal to the last blade of the series of herringbone blades, means journalling the cutting rolls to rotate with their axes co-planar and with their corresponding blade portions swingable into closely spaced relation for trimming a butt welded joint across the strip, means to rotate the rolls simultaneausly in opposite directions to swing corresponding blade portions of the respective rolls concurrently and in the same direction through the plane extending through and between the roll axes, means on the frame on opposite sides of said plane for supporting the strip for endwise movement through the cutting rolls along a pass-line which is substantially normal to said plane where it intersects the plane, and clamping means on the roll journalling means adjacent the pass-line and spaced from said plane on the side thereof from which the blades swing into cutting position, said clamping means being openable to allow the strip to pass therethrough when the cutting rolls are not in operation and closeable to clamp and hold the strip in tension against the force of the blades when the cutting rolls are in operation, the portion of the strip extending through said plane between the clamping and supporting means being disposed substantally normal to said plane and in flexibly self-centering relation between the cutting rolls during the cutting operation, whereby a welded joint connecting adjacent flexible strip sections is quickly and evenly trimmed between the cutting rolls.

8. A machine for trimming a flexible metal strip made up of elongated sections butt welded end to end, comprising frame means, a pair of cutting rolls with corresponding blades thereon, each of said rolls having a cylindrical body and a plurality of blades mounted on the body, the leading blade being centrally located and narrow relative to the roll axis in order to cut away the center of the welded joint, and the succeeding blades as the roll rotates having successively increased radial projection of their edges from the roll axis and being arranged in helical herringbone formation pointing toward the leading blade as the roll rotates in order to shear the welded joint progressively outwardly from the center, means journalling the cutting rolls to rotate with their axes co-planar and with their corresponding blade portions swingable into closely spaced relation for trimming a butt welded joint across the strip, means to rotate the rolls simultaneously in opposite directions to swing corresponding blade portions of the respective rolls concurrently and in the same direction through the plane extending through and between the roll axes, means on the frame on opposite sides of said plane for supporting the strip for endwise movement through the cutting rolls along a pass-line which is substantally normal to said plane where it intersects the plane, and clamping means on the roll journalling means adjacent the pass-line and spaced from said plane on the side thereof from which the blades swing into cutting position, said clamping means being openable to allow the strip to pass therethrough when the cutting rolls are not in operation and closeable to clamp and hold the strip in tension against the force of the blades when the cutting rolls are in operation, the portion of the strip extending through said plane between the clamping and supporting means being disposed substantially normal to said plane and in flexibly self-centering relation between the cutting rolls during the cutting operation, whereby a welded joint connecting adjacent flexible strip sections is quickly and evenly trimmed between the cutting rolls.

9. A machine for trimming a flexible metal strip made up of elongated sections butt welded end to end, comprising frame means, a pair of cutting rolls having a cylindrical body and a plurality of blades mounted on the body, the leading blade being centrally located and narrow relative to the roll axis in order to cut away the projecting flash metal at the center of the welded joint, and the succeeding blades as the roll rotates having a progressively greater radial projection of their edges from the roll axis and being arranged in helical herringbone formation pointing toward the leading blade as the roll rotates in order to shear the welded joint progressively outwardly from the center, the leading blade having radial projection from the roll axis greater than the radial projection of the leading herringbone blade and less than the radial projection of the last herringbone blade as the roll rotates, means journalling the cutting rolls to rotate with their axes co-planar and with their corresponding blade portions swingable into closely spaced relation for trimming a butt welded joint across the strip, means to rotate the rolls simultaneously in opposite directions to swing corresponding blade portions of the respective rolls concurrently and in the same direction through the plane extending through and between the roll axes, means on the frame on opposite sides of said plane for supporting the strip for endwise movement through the cutting rolls along a pass-line which is substantially normal to said plane where it intersects the plane, and clamping means on the roll journalling means adjacent the pass-line and spaced from said plane on the side thereof from which the blades swing into cutting position, said clamping means being openable to allow the strip to pass therethrough when the cutting rolls are not in operation, and closeable to clamp and hold the strip in tension against the force of the blades when the cutting rolls are in operation, the portion of the strip extending through said plane between the clamping and supporting means being disposed substantially normal to said plane and in flexibly self-centering relation between the cutting rolls during the cutting operation, whereby a welded joint connecting adjacent flexible strip sections is quickly and evenly trimmed between the cutting rolls.

10. A machine for trimming a flexible metal strip made up of elongated sections butt-welded end to end, comprising a pair of frames, movably mounted on the machine a pair of cutting rolls journalled on the respective frames with coplanar axes, a plurality of blade portions on the respective rolls swingable into closely spaced relation for trimming a butt-welded joint across the strip, the leading blade on each roll being located intermediate the ends of the roll and narrow relative to the roll width and projecting radially outwardly at least to the desired maximum depth of cut, each of the succeeding blade portions on each roll extending across the roll and projecting radially outwardly from the axis of the roll a successively greater distance than the preceding blade beginning at a distance intermediate the length of the leading blade and increasing stepwise with the last blade projecting a distance equal to the leading blade, said succeeding blade portions extending in helical herringbone formation across the roll body behind the leading blade, means to rotate the rolls simultaneously in opposite directions to swing corresponding blade portions on the respective rolls concurrently and in the same direction through the plane extending through and between the roll axes, means on opposite sides of said plane for supporting the strip for endwise movement through the rolls and clamping means adjacent the rolls holding the strip in tension against the force of the blades when the cutting rolls are in operation and means on the frames carrying the clamping means and roll means to simultaneously open and close the clamping means and the cutting rolls, whereby variations in strip thickness vary the spacing between the clamping members holding the strip and thereby automatically adjust the spacing between the cutting rolls to accommodate different strip thicknesses.

References Cited in the file of this patent

UNITED STATES PATENTS

| | | |
|---|---|---|
| 141,012 | Pillings | July 22, 1873 |
| 567,756 | Strite | Sept. 15, 1896 |
| 1,975,939 | Grotnes | Oct. 9, 1934 |
| 2,256,559 | Harder | Sept. 23, 1941 |
| 2,327,296 | Wildhaber | Aug. 17, 1943 |
| 2,433,145 | Nord | Dec. 23, 1947 |
| 2,437,829 | Mason | Mar. 16, 1948 |
| 2,497,023 | Austin | Feb. 7, 1950 |

FOREIGN PATENTS

| | | |
|---|---|---|
| 538,589 | Great Britain | Aug. 8, 1941 |